US006532497B1

(12) United States Patent
Cromer et al.

(10) Patent No.: US 6,532,497 B1
(45) Date of Patent: *Mar. 11, 2003

(54) SEPARATELY POWERED NETWORK INTERFACE FOR REPORTING THE ACTIVITY STATES OF A NETWORK CONNECTED CLIENT

(75) Inventors: Daryl Carvis Cromer, Cary, NC (US); Brandon Jon Ellison, Raleigh, NC (US); Eric R. Kern, Durham, NC (US); Gregory William Kilmer, Raleigh, NC (US); Howard Locker, Cary, NC (US); Randall Scott Springfield, Chapel Hill, NC (US); James Peter Ward, Raleigh, NC (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/060,280

(22) Filed: Apr. 14, 1998

(51) Int. Cl.[7] .......................... G06F 15/16; G06F 15/173
(52) U.S. Cl. ........................................ 709/250; 709/224
(58) Field of Search ................................. 709/250, 224, 709/300, 318; 714/4, 48; 710/15, 17–19; 713/300; 370/463; 375/219–220, 222

(56) References Cited

U.S. PATENT DOCUMENTS

| 5,257,384 | A | * | 10/1993 | Farrand et al. ............... 710/105 |
| 5,283,905 | A | * | 2/1994 | Saadeh et al. ............... 713/324 |
| 5,355,484 | A | * | 10/1994 | Record et al. ............... 395/704 |
| 5,410,706 | A | * | 4/1995 | Farrand et al. ................. 713/2 |
| 5,430,875 | A | * | 7/1995 | Ma ............................. 709/302 |
| 5,440,699 | A | * | 8/1995 | Farrand et al. ............... 345/329 |
| 5,566,337 | A | * | 10/1996 | Szymanski et al. .......... 710/260 |
| 5,594,426 | A | * | 1/1997 | Ushijima et al. ........ 340/825.02 |
| 5,671,347 | A | * | 9/1997 | Barstow et al. .............. 345/473 |
| 5,713,045 | A | * | 1/1998 | Berdahl ........................ 710/73 |
| 5,764,886 | A | * | 6/1998 | Danielson et al. ............. 714/47 |
| 5,768,523 | A | * | 6/1998 | Schmidt ....................... 709/224 |
| 5,809,313 | A | * | 9/1998 | Gianni ......................... 713/310 |
| 5,815,652 | A | * | 9/1998 | Ote et al. ....................... 714/31 |
| 5,881,315 | A | * | 3/1999 | Cohen ........................... 710/52 |
| 5,910,876 | A | * | 6/1999 | Sharma et al. ................. 361/86 |
| 5,925,108 | A | * | 7/1999 | Johnson et al. .............. 709/300 |
| 5,978,912 | A | * | 11/1999 | Rakavy et al. .................. 713/2 |
| 6,003,081 | A | * | 12/1999 | Cromer et al. ............... 709/224 |
| 6,070,253 | A | * | 5/2000 | Tavallaei et al. ............... 714/31 |
| 6,101,608 | A | * | 8/2000 | Schmidt et al. .............. 713/202 |
| 6,119,228 | A | * | 9/2000 | Angelo et al. ............... 713/180 |

(List continued on next page.)

Primary Examiner—Andrew Caldwell
(74) Attorney, Agent, or Firm—Bracewell & Patterson, LLP; Carlos Munoz-Bustamante

(57) ABSTRACT

An intelligent network interface monitors activity states of a client and reports them to a network manager using a single network connection. The network interface monitors interrupts occurring on the client, derives activity states from the interrupts, and logs the activity states on the network interface. An activity state specifies whether the client is in a hung state, but may also specify whether the client is off, sleeping, inactive, or active. The network interface may periodically report the activity states to the network manager or report upon receiving a command. The network interface is preferably powered full time using a trickle power supply and therefore operates even when the remainder of the client is off. By including a processor or specialized logic on the network interface, the interface operates independently of the client operating system and therefore monitors and reports even when the client malfunctions.

27 Claims, 8 Drawing Sheets

U.S. PATENT DOCUMENTS

| | | | |
|---|---|---|---|
| 6,134,665 A | * 10/2000 | Klein et al. | 713/300 |
| 6,134,668 A | * 10/2000 | Sheik et al. | 713/310 |
| 6,158,020 A | * 12/2000 | Locker et al. | 714/13 |
| 6,161,178 A | * 12/2000 | Cromer et al. | 713/2 |
| 6,175,927 B1 | * 1/2001 | Cromer et al. | 713/300 |
| 6,189,108 B1 | * 2/2001 | Cromer et al. | 713/340 |
| 6,237,100 B1 | * 5/2001 | Cromer et al. | 713/300 |
| 6,249,812 B1 | * 6/2001 | Cromer et al. | 709/221 |
| 6,266,696 B1 | * 7/2001 | Cromer et al. | 709/224 |
| 6,282,642 B1 | * 8/2001 | Cromer et al. | 713/1 |
| 6,292,831 B1 | * 9/2001 | Cheng | 709/224 |

* cited by examiner

SEPARATELY POWERED NETWORK INTERFACE FOR REPORTING THE ACTIVITY STATES OF A NETWORK CONNECTED CLIENT

BACKGROUND OF THE INVENTION

1. Field of the Invention

The invention relates in general, to support of intelligent client computer systems on a network, and to remote maintenance support of such systems in particular.

2. Background

When enterprise computer networks were based on mainframes with "dumb" terminals at remote locations, the network manager had complete control over the network and processing was performed at the mainframe. Personal computers provide major processing power on the desktop and, as first deployed, were not connected in networks so that all support and maintenance was local. Now, desktop computers are increasingly being tied into networks; but, unlike mainframe managers, the network manager of a PC network has limited control and information of the respective clients, with their ability to customize software and hardware configurations.

With such systems that are capable of standalone operation, far more can go wrong that is outside the network manager's knowledge or control. This flexibility and power is valuable to the end user but limits the ability of the network manager to do maintenance and support. To a large degree the network manager must "fly blind" when working with an unattended remote client system.

This is a situation is becoming more difficult as personal computer complexity and power increases. Moreover, clients are becoming more dependant on their systems to do their work and less tolerant of downtime. To make matters worse today's powerful systems are difficult for most users to deal with when abnormal operation (e.g. a fault or system hang) occurs. An error message is an unwelcome visitor.

There is some software available to manage systems remotely such as IBM's NetFinity, Intel's LanDesk, and Hewlett Packard's Openview. There are also advanced diagnostics such as PC Doctor.

Since, however, all these management programs run as applications on the operating system, the system must be functional, to some significant degree, in order to use such programs. In other words, the management software can only manage a functional system. Even the simplest of failures can prevent the system from being thus manageable, resulting in a costly on-site service call. Intermittent problems make matters worse because even on-site service may not be able to duplicate the problem situation.

SUMMARY OF THE INVENTION

According to the invention, local logic that is able to monitor interrupts and system conditions incident to interrupts, creates a log of events that identify system problems yet is independently functional of the client system on which it resides. By so coupling such logic to the network through the client system network connector that it can, at any time, alert the network manager of system condition using a packet which conforms to the network protocol as if sent by the client, the manager can respond to system hangs and other errors effectively, even when the system is unattended.

Using independently generated signals conforming to normal network communication protocol to transfer information avoids any necessity to expand or redo the network. For example, a standard Ethernet network passes the packets, which look like normal data packets, to alert the network manager to error conditions in the system that would otherwise be undetectable without on-sight presence. Furthermore, the availability of a history collected at the time of the incident facilitates identification of problems, even intermittent problems, that are difficult to identify and correct using after-the-fact, on-sight fault determination. By so enabling clients, they identify their operational state whether normal, hung or inoperative due to a crash without changing the connecting structure of the network and by such use of monitoring and auxiliary logic this information can be sent even though the client itself is not able to execute a program. Indeed, if the operating system has crashed the manager can be informed and take action to download a new image to the client's fixed drive. The packet may be sent intermittantly or in response to a predefined request packet sent over the network by the network manager.

BRIEF DESCRIPTION OF THE DRAWINGS

A presently preferred implementation for the invention will now be described in detail with reference to the drawings wherein.

DESCRIPTION OF THE PREFERRED EMBODIMENT

Figure 1:
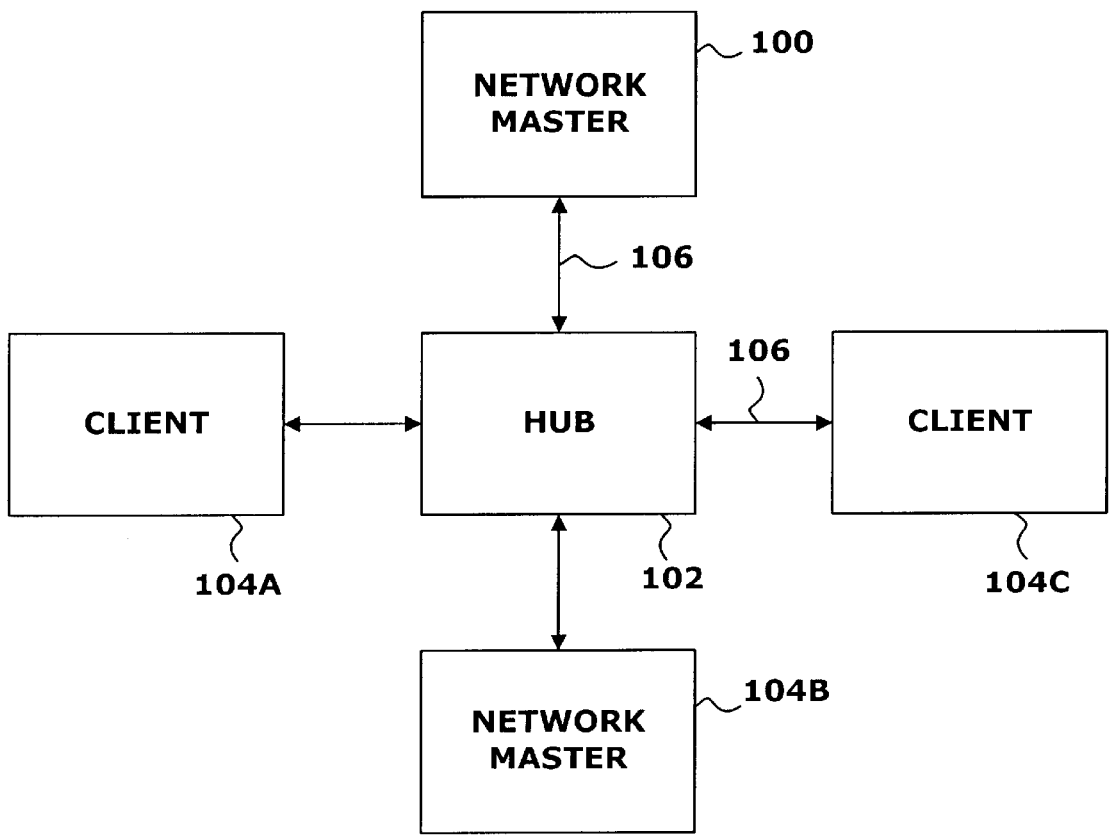
FIG. 1 is a block diagram of a network arrangement suitable for implementation of the invention.

Referring to FIG. 1, a network manager system 100 is connected to a hub 102 by a LAN connector bus 106. Respective client systems 104A–C also connect to the hub 102 through respective LAN busses 106 The preferred form of network conforms to the Ethernet specification and uses such hubs. It will be appreciated however that other forms of networks such as token ring may be implemented to include the invention.

Figure 2:
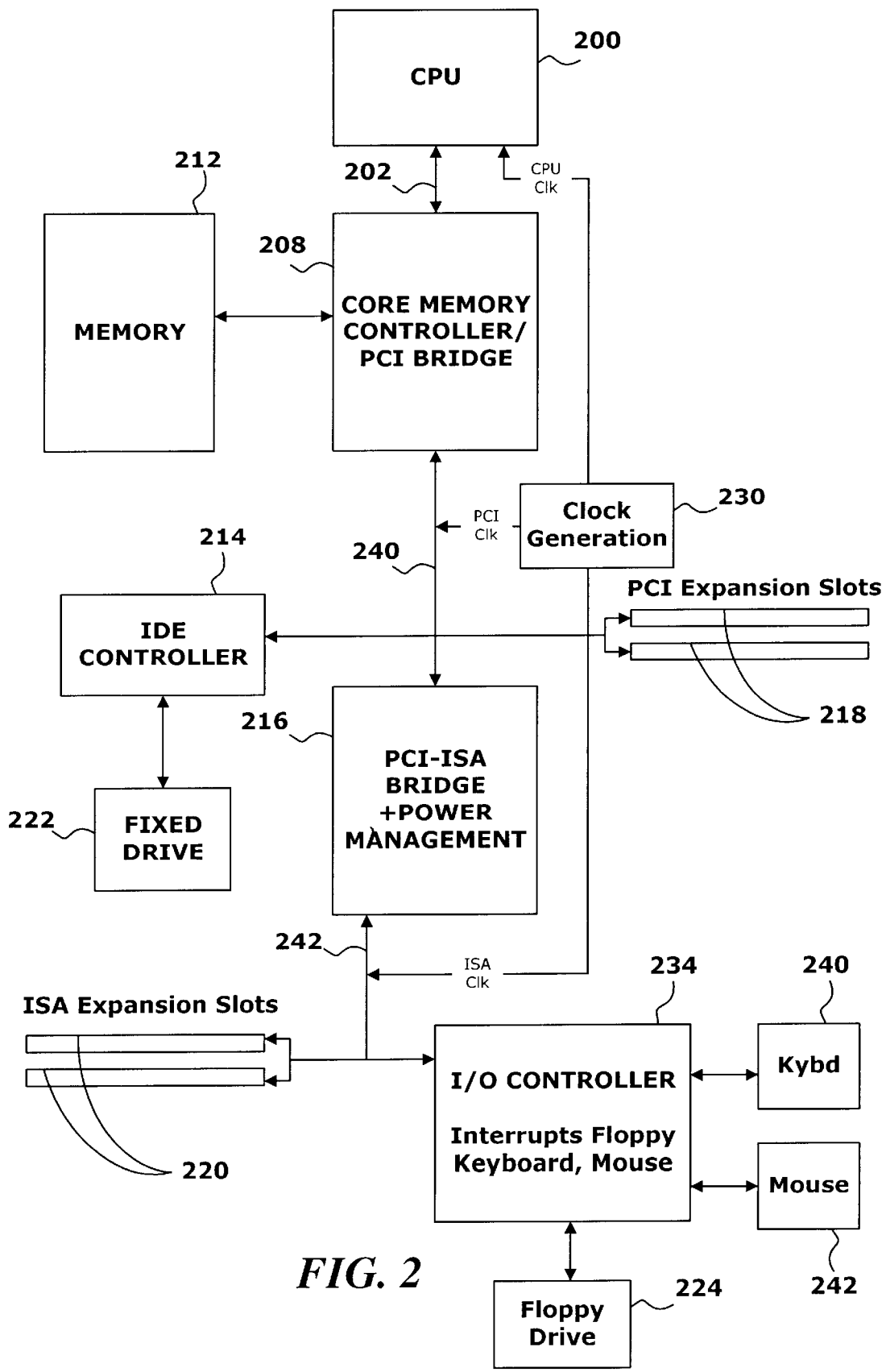
FIG. 2 is a block diagram of a client system suitable for implementation of the invention.

A computer system suitable for use as a client station 104 is indicated in FIG. 2. A central processing unit (CPU) 200 is connected by address, control and data busses 202 to a memory controller and PCI bus bridge chip 208. System memory 212 is connected to the chip 208. Connected to standard PCI expansion bus 240 are the memory controller PCI bridge chip 208, IDE device controller 214, connector slots 218, and a PCI bus to ISA bus bridge chip 216 which typically also includes power management logic. ISA standard expansion bus 242 with connector slots 220 is connected to bridge chip 216. It will be appreciated that other expansion bus types may be used to permit expansion of the system with added devices and it is not necessary to have two expansion busses For an intelligent client station 104 there would normally input devices and data storage devices such as fixed and a floppy drive 222 and 224. The fixed drive 222 is connected to IDE controller 214 where as the floppy drive 224 is connected to I/O controller 234. IO controller 234 is connected to ISA bus 242 and also includes interfaces for keyboard 240 and mouse 242. The clocks for CPU 200, PCI bus 240, and ISA bus 242 are provided by clock generation module 230.

Figure 3:
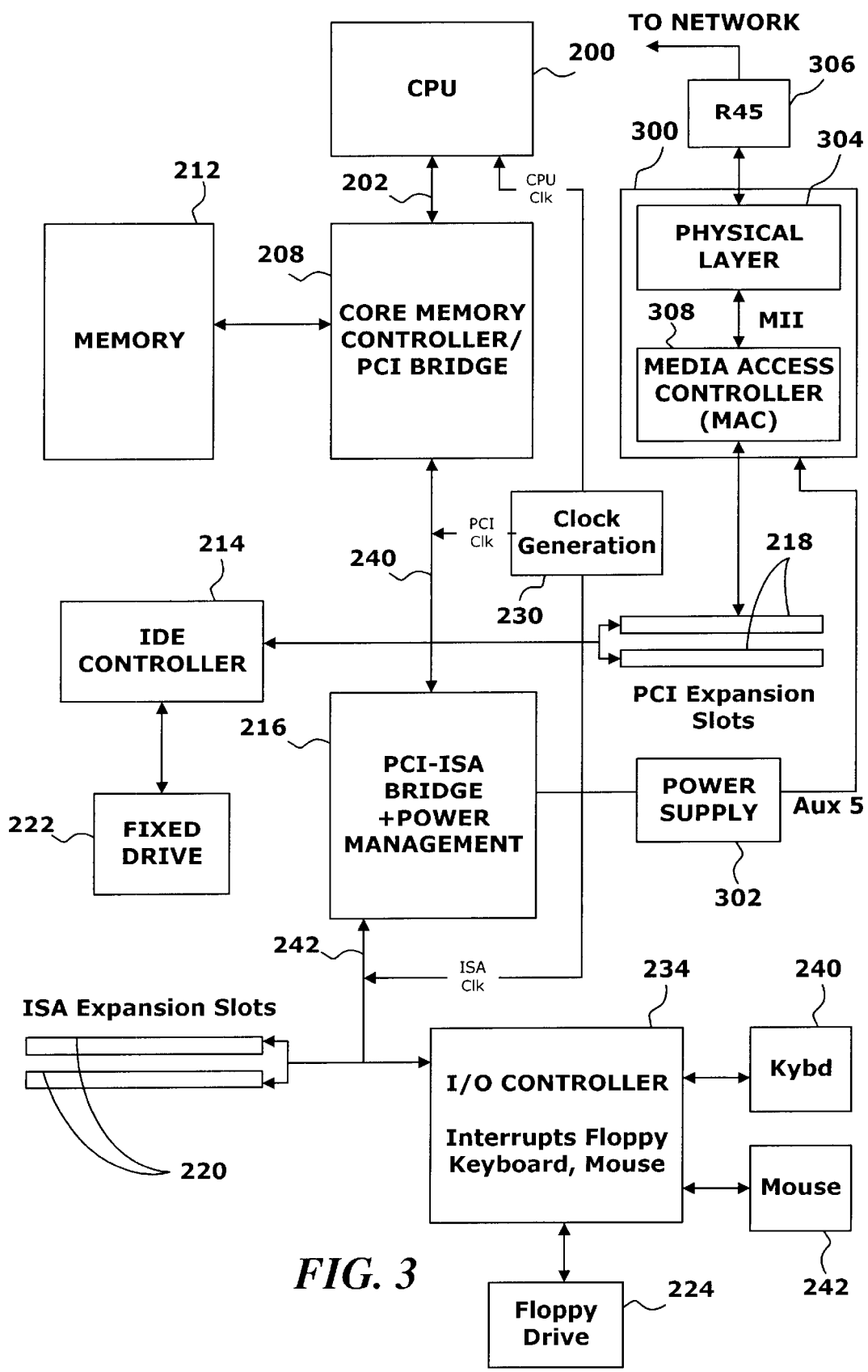
FIG. 3 is a block diagram of a system client with normal network connection circuitry.

Now, referring to FIG. 3, a client system 104, has a network adapter 300, which may, for example be plugged into one of connector slots 218. The client system 104 is shown with a special power supply 302 which supplies full normal system power and has a auxiliary power main Aux 5 which supplies full time power to the network adapter 300. This enables the system, as is known, to respond to a wakeup signal from network adapter 300 and power up the system. The network adapter 300 is shown as two elements the physical layer 304 which conditions analog signals to go out to the network, for example an Ethernet network over an R45 connector 306 as is well known. A media access controller (or MAC) 308 processes the network signals in digital form and connect to the PCI bus 240. If the incoming signal conforms to the Magic Packet form it is a wakeup command and the MAC 308 issues a WOL signal to cause the power supply to energize the client system 104. The adapter 300, it should be appreciated, may be added as an adapter card (as shown) or implemented directly on the system motherboard. To support wake up operation it is powered off the full time auxiliary line Aux 5.

Figure 4:
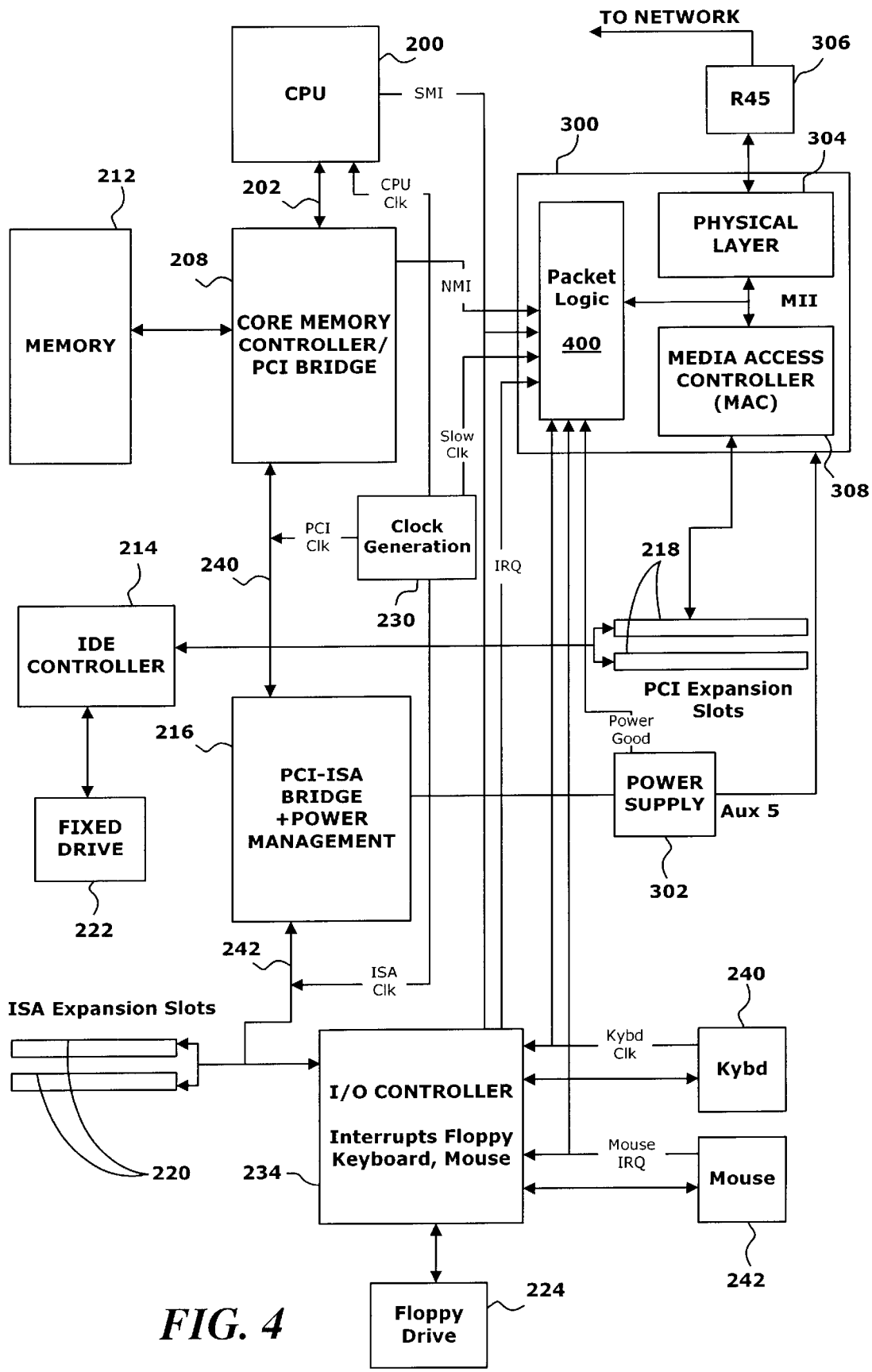
FIG. 4 is a block diagram of a system client with added logic coupled to the network connection circuitry to support transfer of status information over the network.

Now, referring to FIG. 4, a client system 104, has a specially modified network adapter 300' with a logic module 400 connected at the MII bus that extends between the physical layer 304 and the MAC 308. This logic may be a "hard wired" ASIC or a programmed general-purpose processor programmed as described below. By so connecting the logic 400 at the MII bus, it can send network packets using the physical layer 304. The logic 400 according to the invention monitors logic signal from client system 104, detects states, creates packets, and sends data over the MII bus to physical layer 304. With the trickle power supplied on bus Aux 5 of power supply 302 the logic 400 is preferably powered full time. Logic 400 monitors the following signals System Management Interrupt (SMI) slow clock active (Slow Clk), Interrupts (IRQ), Keyboard IRQ, Mouse IRQ, and power good.

Figure 5:
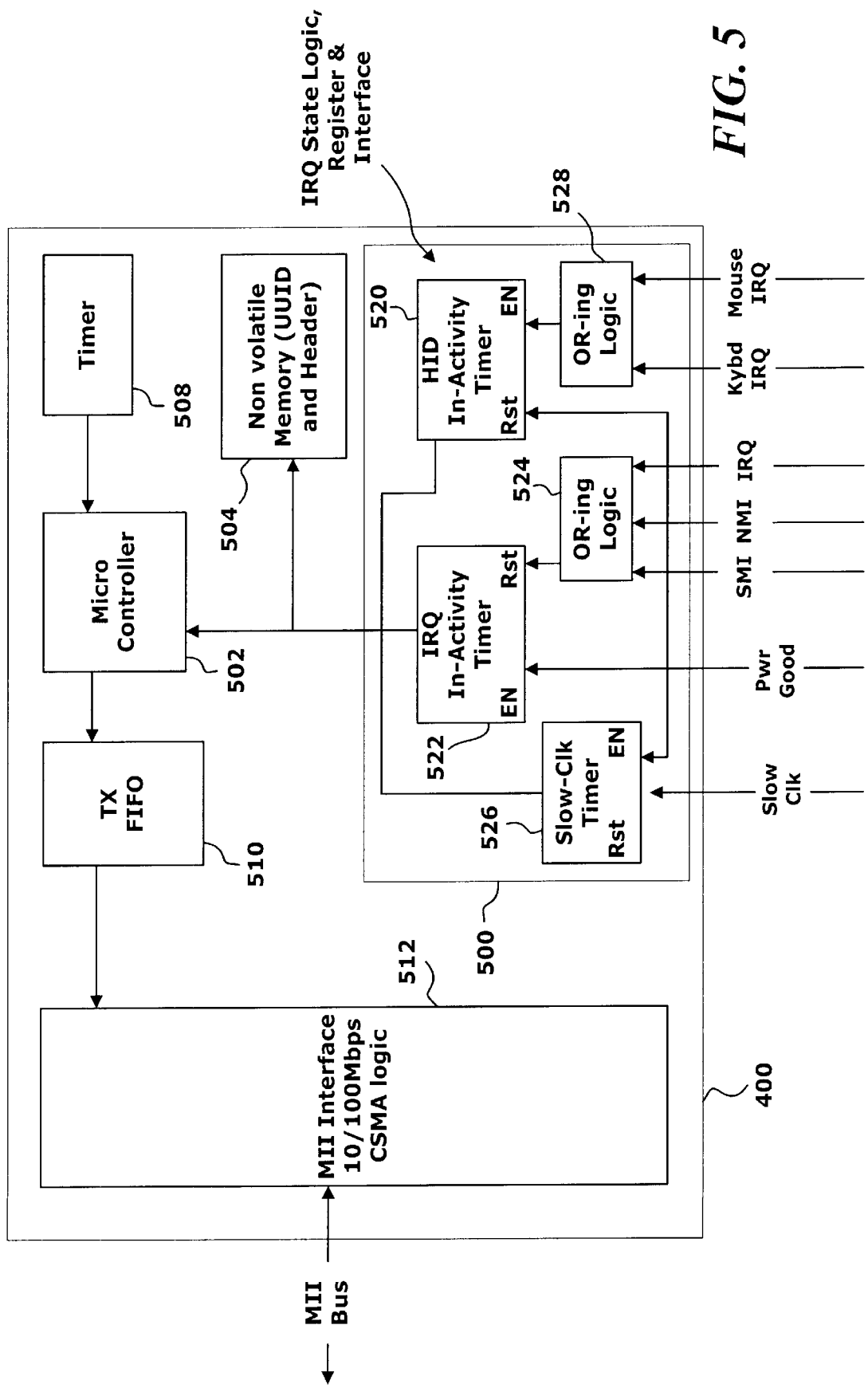
FIG. 5 is a block diagram showing logic for collecting selected system information and chip modules connections to perform the role of the auxiliary logic according to the invention.

FIG. 5 illustrates logic for collecting selected system information and chip modules connections to perform the role of the auxiliary logic according to the invention. When timer 508 expires, microcontoller 502 according the invention will gather information for packet generation such as IP header, UDP header and universal identifier (UUID) from non-volatile memory 504. The microcontroller 502 determines the activity state of the client 104 according to flow diagram illustrated in FIG. 8. The packet is then created according to flow diagram illustrated in FIG. 7. The packet is transferred to TX FIFO 510 and then sent to MII interface logic 512. To determine the activity state of the client the microcontroller 502 monitors the slow-clk timer 526, IRQ inactivity timer 522, and Human input activity timer 520. Power good is provided to enable timers 520, 526, and 522.

Logic block 524 is used to OR the SMI, NMI, and IRQ signals from client system 104 to determine if interrupts are being serviced and when an interrupt is serviced resets IRQ timer 522. Logic 528 monitors activity on keyboard 240 or mouse 242 will result in resetting HID timer 520.

Figure 6:
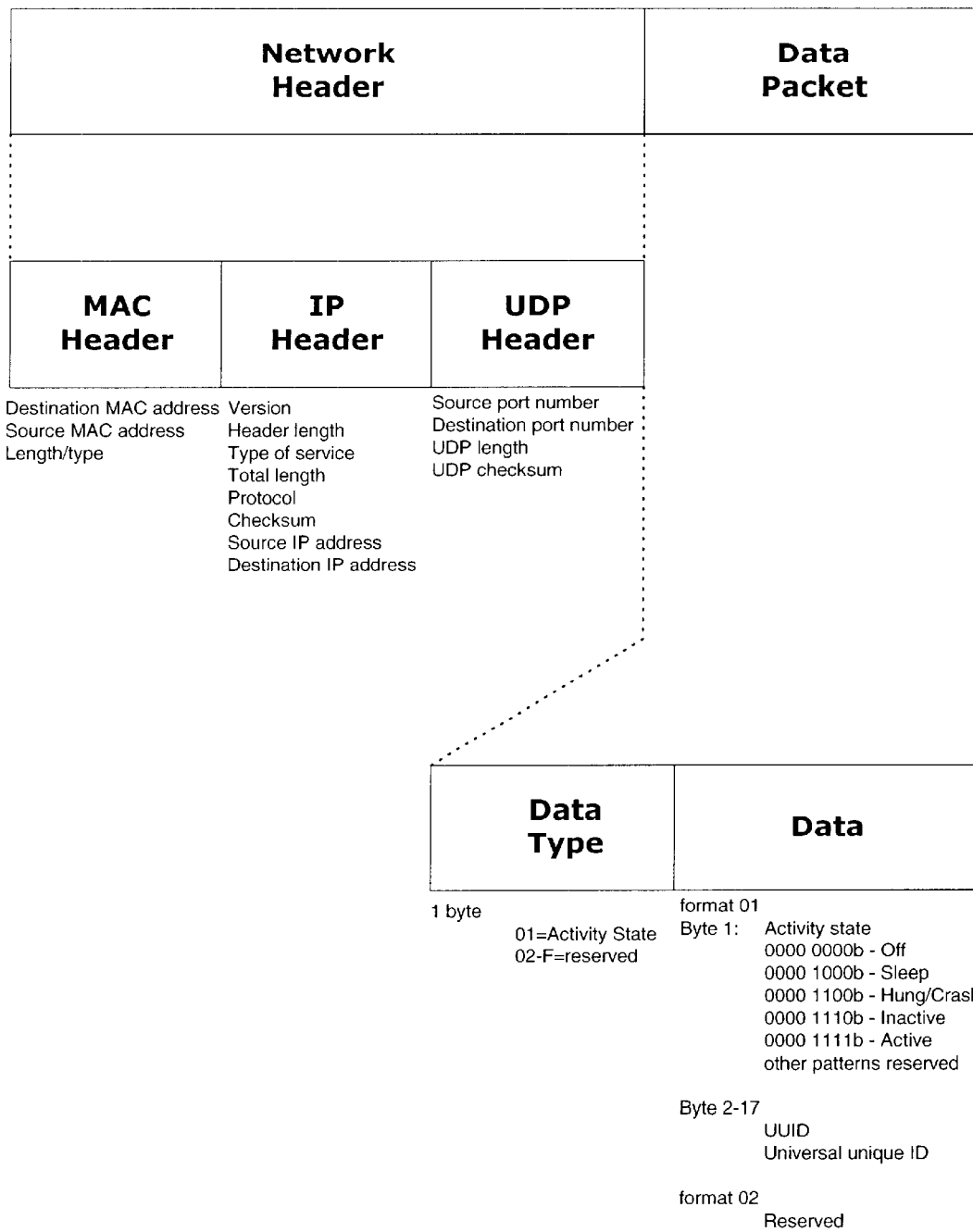
FIG. 6 is a diagrammatic representation of a packet with data areas according to the invention.

A standard packet including a network header and data packet as might be sent over an Ethernet network is indicated in FIG. 6. The network header includes a MAC header, an IP header and UDP header as is known to provide addresses, identifiers and other information for assuring correct transfer. The data packet includes the information content to be transferred. The data type and data patterns indicated are preferably followed according to the invention. First data type is used to set up a category of data which is "activity state" and then a data portion provides specific state (Off, Sleep, Hung/Crash, Inactive, Active).

Figure 7:
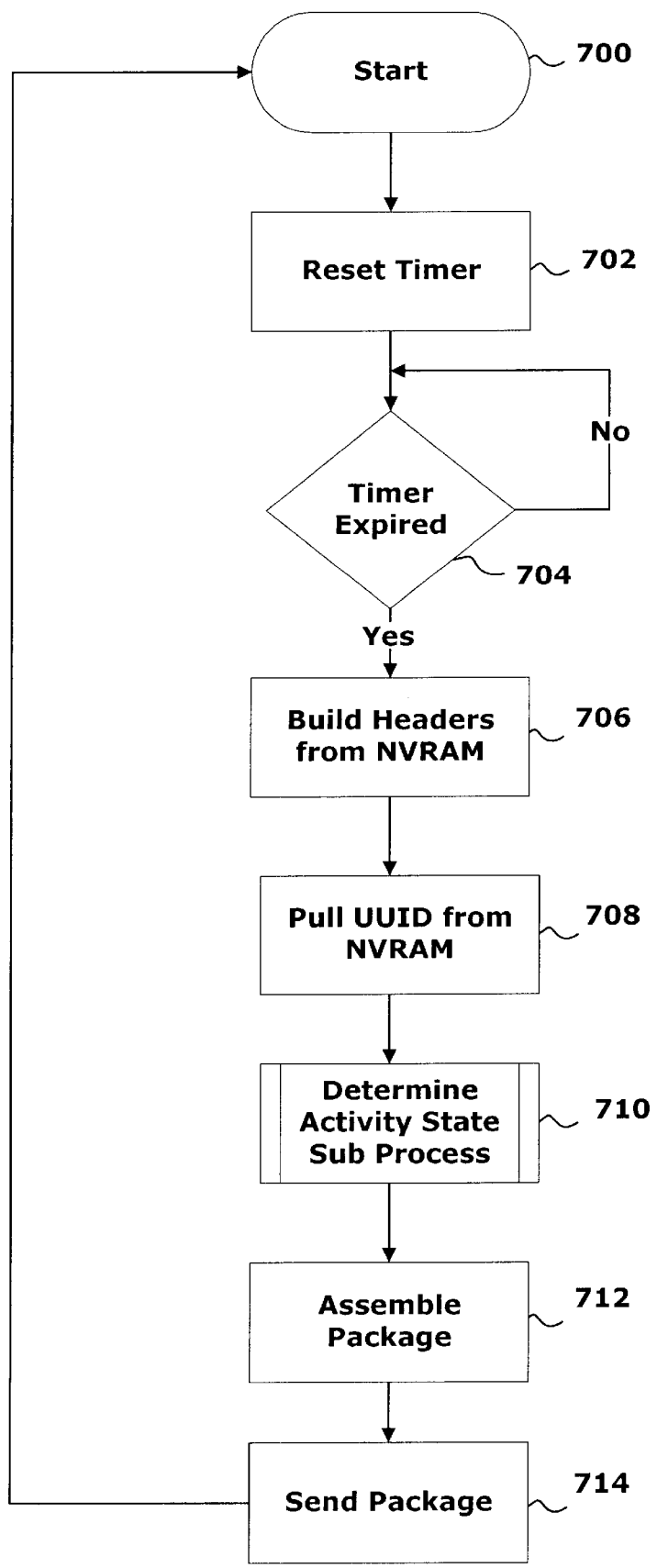
FIG. 7 is a flow chart indicating logic for generating the data packets of FIG. 6 which may be implemented as hard logic or using a programmed general purpose processor.
Figure 8:
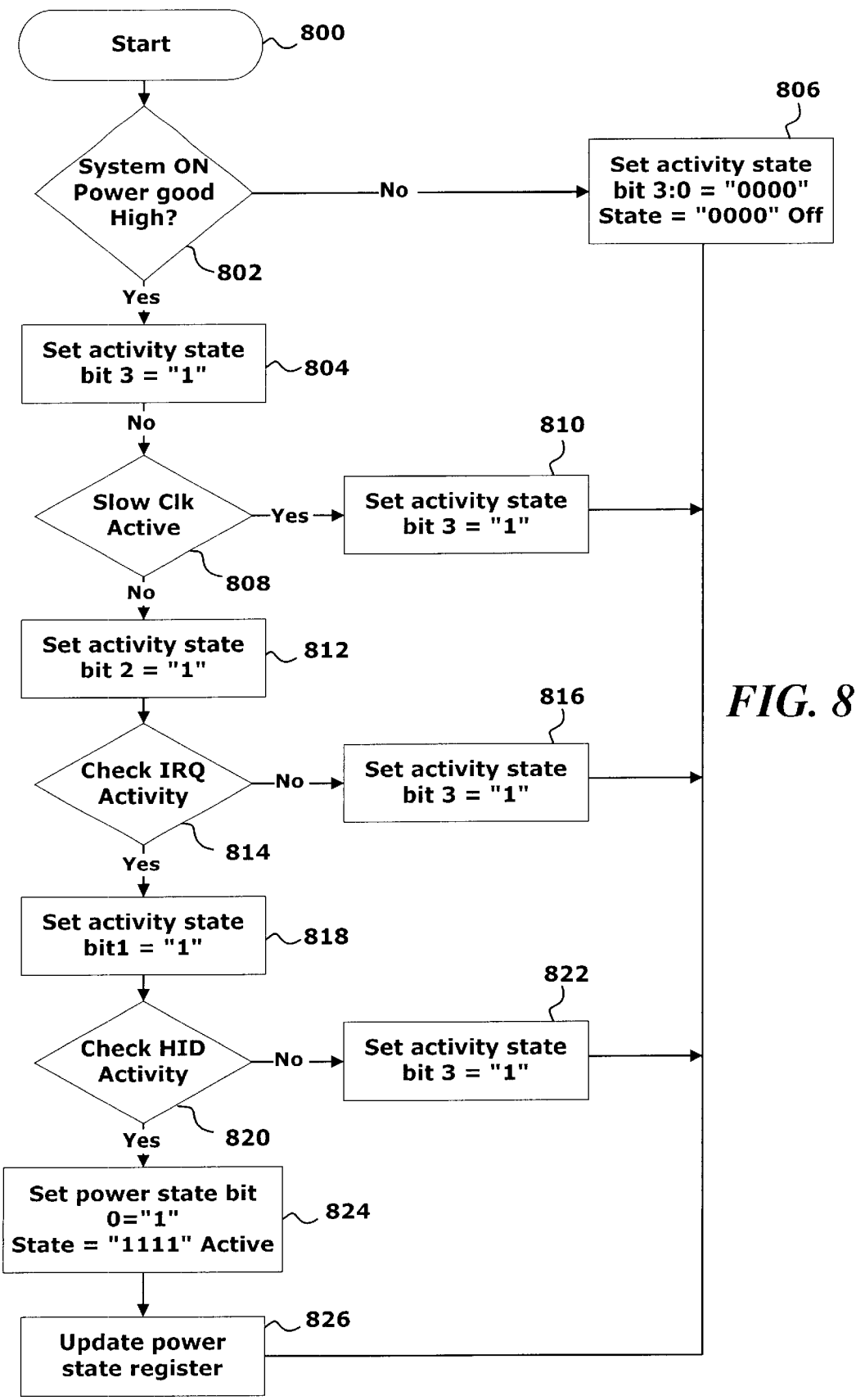
FIG. 8 is a flow chart of a sub-process of FIG. 7 which provides logic for determining the power state which may be implemented as hard logic or using a programmed general purpose processor.

FIG. 7 illustrates to process used by microcontroller 502. The microcontroller 502 resets the timer (702) and waits for timer 508 to expire (704). When timer 508 expires the microcontroller 502 starts assembly of a packet illustrated in FIG. 6. First the micrcontroller 502 builds the headers (706), appends the UUID (708), then determines the activity state using sub-process (710) illustrated in FIG. 8, and then assemblies the packet (712). The packet is sent (714) to TX FIFO 510. FIG. 8 illustrates the sub-process used to determine the activity state of client 104. The microcontroller 502, which is preferably always at full power, determines power state (802) of client 104. The microcontroller progress through a series of decision and accordingly determines the activity bits (3:0), which are used to update power state register (826).

The invention has been described with reference to preferred implementations thereof but it will be appreciated that variations and modifications within the scope of the claimed invention will be suggested to those skilled in the art. For example, the invention may be implemented on networks other than Ethernet networks such as token ring networks or used to control other aspects of a system. The invention may be extended to monitor other devices which exhibit a plurality of operational modes.

What is claimed is:

1. A client system for a network, such system including a CPU being controlled by an operating system and having a single specialized network connection for sending and receiving data over a network in a particular packet format and adapted to run the operating system during normal operation, said client system comprising:

monitoring logic interposed between said CPU controlled by said operating system and said single specialized network connection for monitoring interrupts occurring on the client system and logging activity states derived from said interrupts;

packet logic separate from the CPU and, independent of the operating system for accessing the logged activity states and preparing packets including the logged activity states in the packet format and for transmitting such packets over the single specialized network connection;

request logic separate from the CPU and, independent of the operating system, for receiving a command at said single specialized network connection and responsively triggering the packet logic to transmit a packet including the logged activity states; and a power supply which is adapted to energize the monitoring logic, the packet logic and the single specialized network connection whereby the logged interrupt information is retained and available for transmission at any time, wherein an activity state can specify whether the client is in a hung state.

2. A client system for a network, such system including a CPU being controlled by an operating system and having a single specialized network connection for sending and receiving data over a network in a particular packet format and adapted to run the operating system during normal operation, said client system comprising:

monitoring logic interposed between said CPU controlled by said operating system and said single specialized network connection for monitoring interrupts occurring on the client system and logging activity states derived from said interrupts;

packet logic separate from the CPU and, independent of the operating system for accessing the logged activity states and preparing packets including the logged activity states in the packet format and for transmitting such packets over the single specialized network connection in response to a trigger signal;

request logic separate from the CPU and, independent of the operating system, for receiving a command at said single specialized network connection and responsively applying a trigger signal to the packet logic to transmit a packet including the logged activity states; and a power supply which is adapted to energize the monitoring logic, the packet logic and the single specialized network connection, irrespective of the energization of other portions of the client system whereby the logged interrupt information is retained and available for transmission at any time, wherein an activity state can specify whether the client is in a hung state.

3. A client system according to claim 2 wherein the single specialized network connection is an Ethernet connection having a physical layer and the packet logic applies the packets to the physical layer.

4. A client system for a network, such system including a CPU being controlled by an operating system and having a single specialized network connection for sending and receiving data over a network in a particular packet format and adapted to run an operating system during normal operation, said client system comprising:

monitoring logic interposed between said CPU controlled by said operating system and said single specialized network connection for monitoring interrupts occurring on the client system and logging activity states derived from said interrupts;

packet logic separate from the CPU and, independent of the operating system for accessing the logged activity states and preparing packets including the logged activity states in the packet format and for transmitting such packets over the single specialized network connection when triggered to do so;

request logic separate from the CPU and, independent of the operating system, for intermittently triggering the packet logic to transmit a packet including the logged activity states; and a power supply which is adapted to energize the monitoring logic, the packet logic and the single specialized network connection, irrespective of the energization of other portions of the client system whereby the logged interrupt information is retained and available for transmission at any time, wherein the activity state can specify whether the client is in a hung state.

5. A client system according to claim 4 wherein the single specialized network connection is an Ethernet connection having a physical layer and the packet logic applies the packets to the physical layer.

6. A method in a client computer system for notifying a server computer system of a current one of a plurality of activity states of said client computer system, said client computer system being coupled to said server computer system utilizing a single network connection, said method further comprising the steps of:

monitoring interrupts within said client computer system utilizing a processor included within a network adapter included within said client computer system, said network adapter interposed between said client computer system and said single network connection, said network adapter and said processor functioning independently of a functionality of said client computer system wherein said network adapter and said processor function while said client computer system is either malfunctioning or non-functioning;

determining a current activity state of said client computer system utilizing said monitored interrupts; wherein the activity state can specify whether the client is in a hung state;

logging the current activity state within said network adapter; and transmitting a packet indicating said current activity state utilizing said network adapter to said server computer system.

7. The method according to claim 6, further comprising the step of said server computer system transmitting a packet to said client computer system in response to a receipt of said packet transmitted by said network adapter included in said client computer system, wherein said packet transmitted by said server is responsive to said current activity state of said client computer system indicated by said packet transmitted by said network adapter to said server computer system.

8. The method according to claim 7, further comprising the step of transmitting said packet to said server computer system utilizing said network adapter while said client computer system is unattended.

9. The method according to claim 7, further comprising the steps of:

transmitted a request packet from said server computer system to said client computer system requesting said client computer system to transmit said current activity state of said client computer system; and transmitting said packet indicating said current activity state utilizing said network adapter to said server computer system in response to a receipt of said request packet.

10. The method according to claim 6, wherein said network conforms to an Ethernet specification.

11. The method according to claim 6, further comprising the step of said client computer system monitoring interrupts within said client computer system when an operating system to be executed by said client computer system is not functioning.

12. The method according to claim 6, wherein said step of transmitting a packet indicating said current activity state utilizing said network adapter to said server computer system further comprises the step of transmitting a packet indicating an off state utilizing said network adapter to said server computer system.

13. The method according to claim 6, wherein said step of transmitting a packet indicating said current activity state utilizing said network adapter to said server computer system further comprises the step of transmitting a packet indicating a sleep state utilizing said network adapter to said server computer system.

14. The method according to claim 6, wherein said step of transmitting a packet indicating said current activity state utilizing said network adapter to said server computer system further comprises the step of transmitting a packet indicating a hung state utilizing said network adapter to said server computer system.

15. The method according to claim 6, wherein said step of transmitting a packet indicating said current activity state utilizing said network adapter to said server computer system further comprises the step of transmitting a packet indicating an inactive state utilizing said network adapter to said server computer system.

16. The method according to claim 6, wherein said step of transmitting a packet indicating said current activity state utilizing said network adapter to said server computer system further comprises the step of transmitting a packet indicating an active state utilizing said network adapter to said server computer system.

17. A client computer system for notifying a server computer system of a current one of a plurality of activity states of said client computer system, said client computer system being coupled to said server computer system utilizing a single network connection, comprising:

a processor included within a network adapter included within said client computer system for monitoring interrupts within said client computer system, said network adapter interposed between said client computer system and said single network connection, said network adapter and said processor functioning independently of a functionality of said client computer system wherein said network adapter and said processor function while said client computer system is either malfunctioning or non-functioning;

said processor for determining a current activity state of said client computer system utilizing said monitored interrupts, wherein an activity state can specify whether the client is in a hung state, and logging the current activity state within said network adapter; and said network adapter for transmitting a packet indicating said current activity state to said server computer system.

18. The client computer system according to claim 17, further comprising said server computer system for transmitting a packet to said client computer system in response to a receipt of said packet transmitted by said network adapter included in said client computer system, wherein said packet transmitted by said server is responsive to said current activity state of said client computer system indicated by said packet transmitted by said network adapter to said server computer system.

19. The client computer system according to claim 18, further comprising said network adapter for transmitting said packet to said server computer system while said client computer system is unattended.

20. The client computer system according to claim 18, further comprising:

said server computer system for transmitted a request packet from said server computer system to said client computer system requesting said client computer system to transmit said current activity state of said client computer system; and said network adapter of said client computer system for transmitting said packet indicating said current activity state to said server computer system in response to a receipt of said request packet.

21. The client computer system according to claim 17, wherein said network conforms to an Ethernet specification.

22. The client computer system according to claim 17, further comprising said client computer system for monitoring interrupts within said client computer system when an operating system to be executed by said client computer system is not functioning.

23. The client computer system according to claim 17, wherein said network adapter for transmitting a packet indicating said current activity state to said server computer system further comprises said network adapter for transmitting a packet indicating an off state to said server computer system.

24. The client computer system according to claim 17, wherein said network adapter for transmitting a packet indicating said current activity state to said server computer system further comprises said network adapter for transmitting a packet indicating a sleep state to said server computer system.

25. The client computer system according to claim 17, wherein said network adapter for transmitting a packet indicating said current activity state to said server computer system further comprises said network adapter for transmitting a packet indicating a hung state to said server computer system.

26. The client computer system according to claim 17, wherein said network adapter for transmitting a packet indicating said current activity state to said server computer system further comprises said network adapter for transmitting a packet indicating an inactive state to said server computer system.

27. The client computer system according to claim 17, wherein said network adapter for transmitting a packet indicating said current activity state to said server computer system further comprises said network adapter for transmitting a packet indicating an active state to said server computer system.

* * * * *